United States Patent [19]

Stob

[11] Patent Number: 5,091,607
[45] Date of Patent: Feb. 25, 1992

[54] ENERGY DISTRIBUTION RACEWAY

[75] Inventor: Henry R. Stob, Grand Rapids, Mich.

[73] Assignee: Compatico, Inc., Grand Rapids, Mich.

[21] Appl. No.: 535,579

[22] Filed: Jun. 11, 1990

[51] Int. Cl.⁵ .............................................. H02G 3/28
[52] U.S. Cl. ........................................ 174/48; 52/239
[58] Field of Search .................... 174/48, 49; 439/215; 52/173, 220, 221, 239; 160/127, 135, 351

[56] References Cited

U.S. PATENT DOCUMENTS

| | | | |
|---|---|---|---|
| 4,199,206 | 4/1980 | Haworth et al. | 439/31 |
| 4,406,101 | 9/1983 | Heidmann | 174/48 X |
| 4,407,101 | 10/1983 | Propst et al. | 52/221 X |
| 4,596,098 | 6/1986 | Finkbeiner et al. | 52/239 X |
| 4,713,918 | 12/1987 | Cioffi | 174/48 X |
| 4,899,018 | 2/1990 | Sireci | 174/48 |

Primary Examiner—Leo P. Picard
Assistant Examiner—David A. Tone
Attorney, Agent, or Firm—Miller, Morriss & Pappas

[57] ABSTRACT

A raceway for energy distribution lines in which the sections of the raceway are of the knockdown type with interlocking extrusions requiring minimal use of fasteners and in which access openings and the extruded trim plates and covers interlock with selected other extruded elements to cover gaps in adjacent sections and for closures and covers for connectors and receptacles located and supported in the raceway. The raceways are secured to the bottom margin of wall panels.

7 Claims, 3 Drawing Sheets

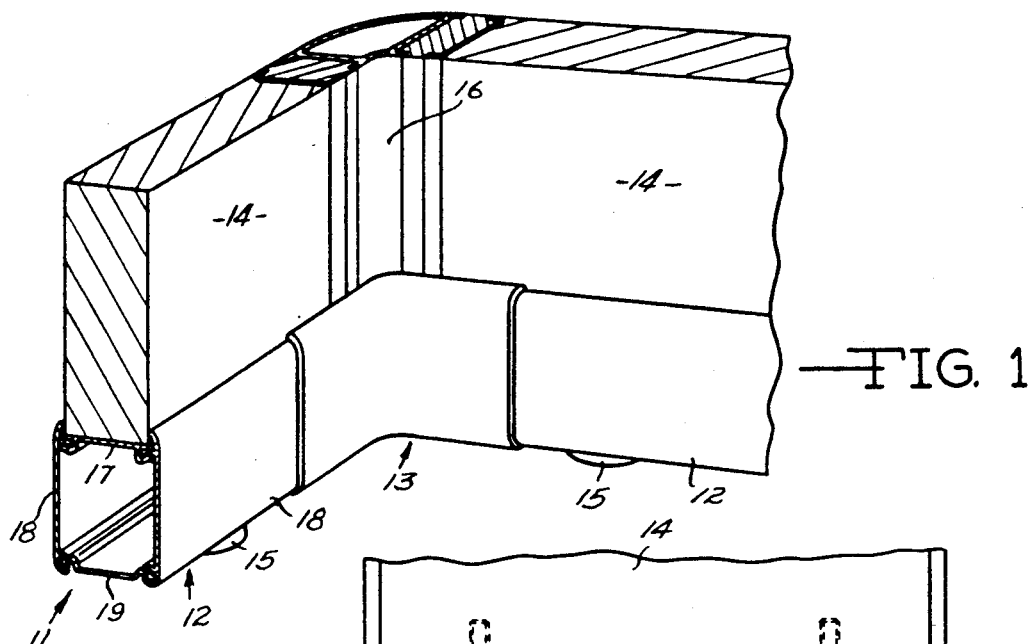
FIG. 1
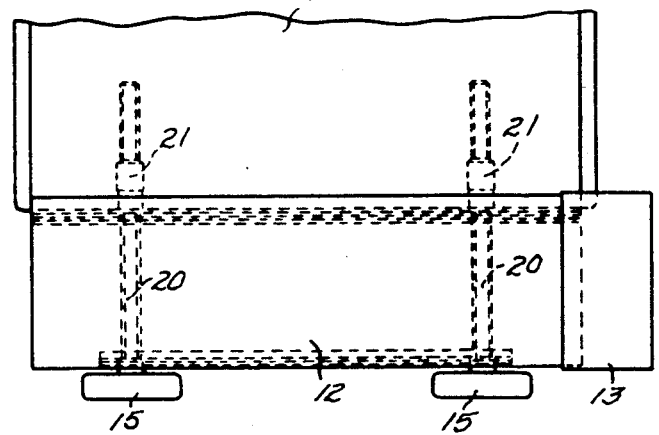
FIG. 2
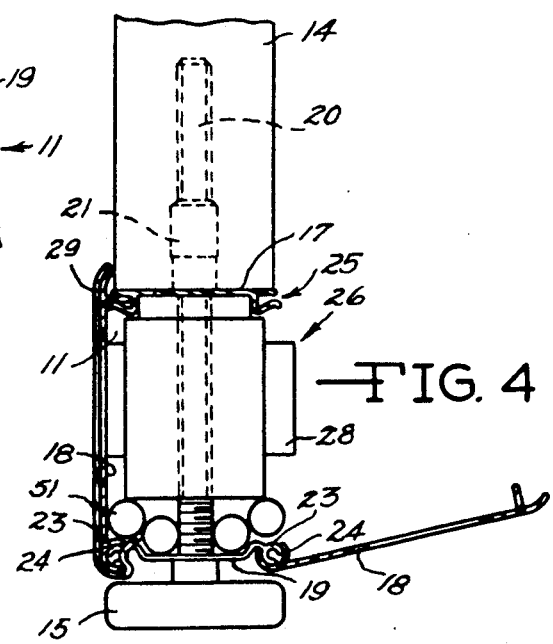
FIG. 3
FIG. 4

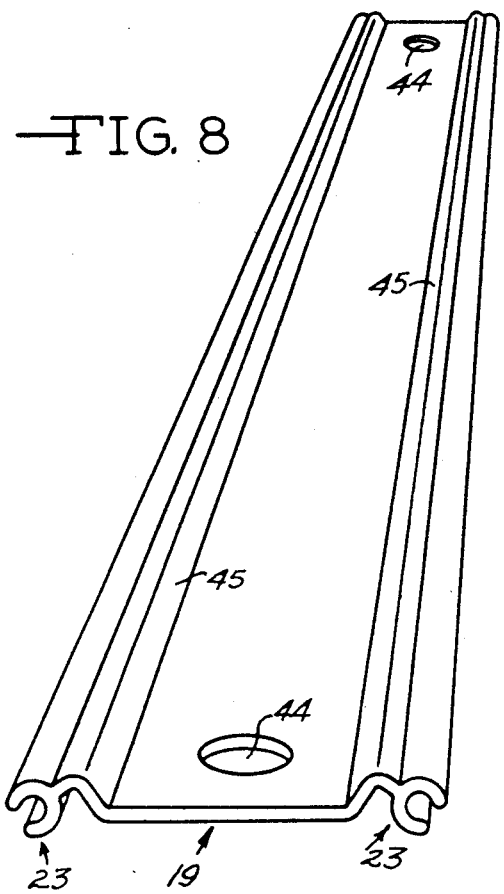
FIG. 8
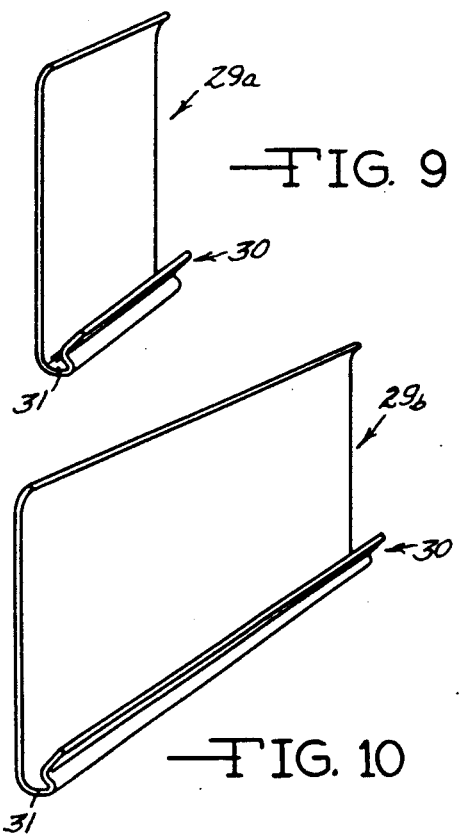
FIG. 9
FIG. 10
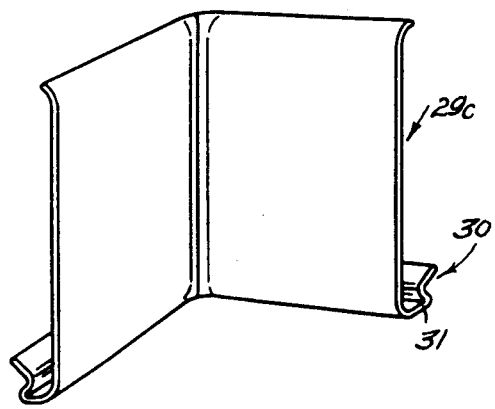
FIG. 11
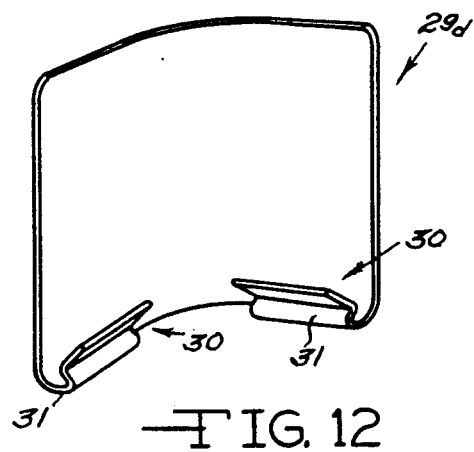
FIG. 12

ENERGY DISTRIBUTION RACEWAY

The present invention relates to an improved raceway of a knockdown extrusion type for energy distribution with panel systems for routing communication and electrical lines to terminals and receptacles for flexibility and convenience in location with appropriate concern for appearance and adaptation to various styles and types of wall panels and for repair and replacement of worn out or seriously damaged existing raceways.

Most prior art structures in which power carrying cables have been provided in raceways have been shop built or made up in the manufacture of the panel modules with cables, receptacles and outlets built into the units and the raceways substantially integrated with the panel structures. A wide variety of panel systems for modular provision of sectionalizing working space in offices are known and have found increasing utility from the mid-1970's. None of those known to the applicant express the structure herein provided. Typical, however, is the structure in U.S. Pat. No. 4,199,206 to Haworth, Saylor and Wilson in which a rectangular perimeter path is defined around each panel.

The present structure is not intended to be built into the panel structure but is intended to be made up and fitted to be attached in section to the bottom margin of existing panels by simplistic usage of extrusions which interlock with each other while encasing and conducting selectively routed communication and power lines from selected entry to selected points of use and through and to each other of attached sections.

The intent is to further extend flexibility in panelling by providing a bundle of extruded pieces easily packaged and handled that interlock at field assembly with minimal separate fastener usage to form sections of raceway and selectively sized to run the length of each panel section.

The materials forming the elongate building blocks may be selected from metal extrudable stock such as aluminum, brass, bronze and metal alloys, for example, and of resin or plastic materials such as polyvinyl chloride (PVC) with selected fillers, pigments and rigidity and from other acceptable well-known resins having rigidity proximate to that of PVC and with good appearance properties. The ability of the PVC to be colored to suit at the time of extrusion extends the decorative potential for the presently described resin or metal structure. In addition the use of PVC or similar plastic assures that the raceway will be electrically insulated. As field assembled, the structures are easily installed in otherwise barren panels and are elevated from contact with the floor or assembly surface by the height adjustable feet supplied with the bundle of knock-down parts or useable from the remnants of any prior assembly.

Accordingly, the principal object is to provide an assemblage of parts which together form the basic elements of the panel raceways and selected standard matching connectors allow a wide range of floor planning for the panels.

At field assembly, the desired power and communication lines (for example, electrical) are placed in the raceway structure and the connections are made to the desired fixtures, outlets and receptacles.

Another object is to extend the decorative options to raceway users in matching new fabrics and decor with selected trim.

Still another object is to bring down cost of the raceway with the attendant benefits and precision of extrusion.

Other objects, including the provision of simple assembly and disassembly, relate to the provision of a raceway for electrical and power lines useable in an extendable manner in furnishings and wall structure situations aside from panels.

GENERAL DESCRIPTION

In general, the present invention is a raceway or lineal enclosure for cables, wires, and energy conducting conduits connected selectively together with receptacles or outlets which are selectively accessible through outlets provided in the extruded elements forming the raceway or enclosure.

The elements of a raceway section are: a top plate extrusion, with connective gripping grooves. The grooves accommodate connection to adjacent plates; a pair of side plate extrusions identical left and right in cross section; a bottom extrusion with cross section connecting protuberances on both sides which connect by interlocking rotation in sockets at the lower end of the side plates; and extruded cover plates for selective attachment to said bottom and sides to cover apertures or lap joints between sections of the basic elements. The cover plates also are basically functional to provide access to the contents of the interior of the raceway section and to provide a transitional trim cover where required. The top plate is selectively penetrated at intervals to permit connection by conventional threaded fasteners, for example, to panel structures to be served by the raceway sections and to accommodate the mounting of the feet of the panels as they extend through the bottom plate and top plate for support connection to the selected panels.

As will be noted, the cover plates interlock functionally with the longitudinal sockets in the bottom plates so as to spring or snap closed upon rotation at interlock to nest against the outer faces of the side plates in a snug and unobtrusive manner.

Modifications of the cover plates as gap covers and corner transitions utilize the same cross section interacting to provide inner and outer curve corner closures with adjacent sections.

As the description proceeds the integration of the recited elements to assemble as sections and as trim elements for the sections will become more comprehendable in simplicity and utility.

In The Drawings

FIG. 1 is a perspective fragment describing two regular sections of raceway at a rounded corner in accord with the present invention and indicating connecting curved transition cover elements in relation to two panels each shown supported by one each of the leveling feet of the panels.

FIG. 2 is a side elevation view of an inside corner showing a fragment of an acoustical panel section resting on the leveling feet and supporting the bottom-attached raceway of the present invention.

FIG. 3 is a top plan view of the two wall panels and indicating the treatment of the transition corners when rounded and in accord with the present invention.

FIG. 4 is an end elevation of a wall panel with attached extruded raceway sections as in FIG. 1, 2 and 3 and indicating the selected location of electrical receptacles and power conducting lines for electricals and communication apparatus and shown in relation to the feet or leveling glides.

Figure 5:
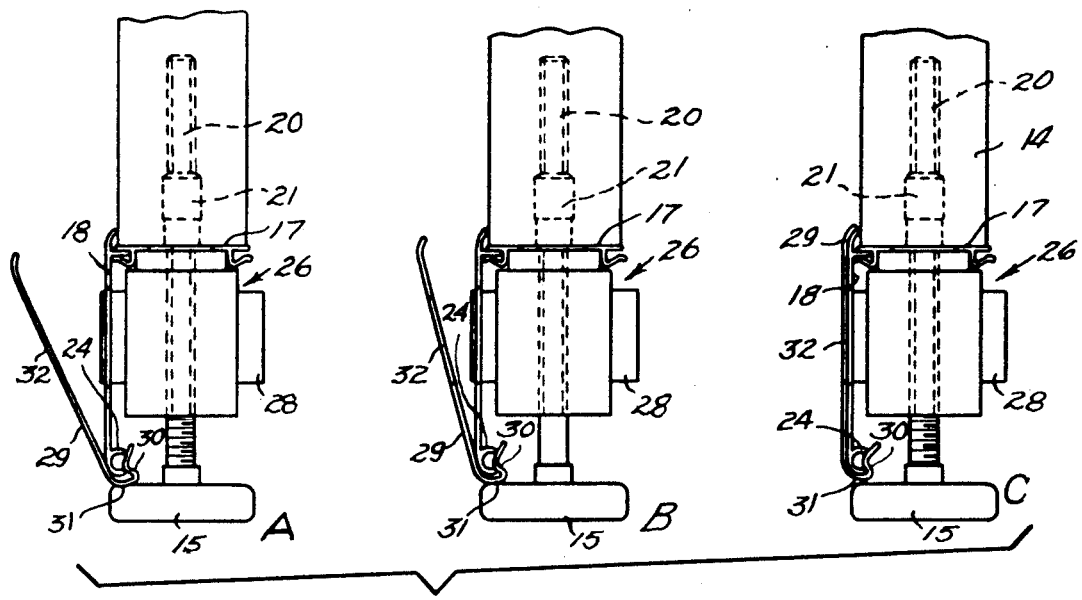

FIG. 5 A, B and C are end elevation views as in FIG. 4 and indicate the manner in which the cover plates cooperate with the side plates at open rounded channel sockets and close springingly into firm, closed bias attitude to nesting relation over the side plates. The cover plates typify the attachment as noted in FIGS. 1, 2 and 3 at the junctures of raceway sections and as transitional curvature at the straight portions as well as in the hatch closure situations of FIG. 5 for access to the receptacles and connectors.

Figure 6:
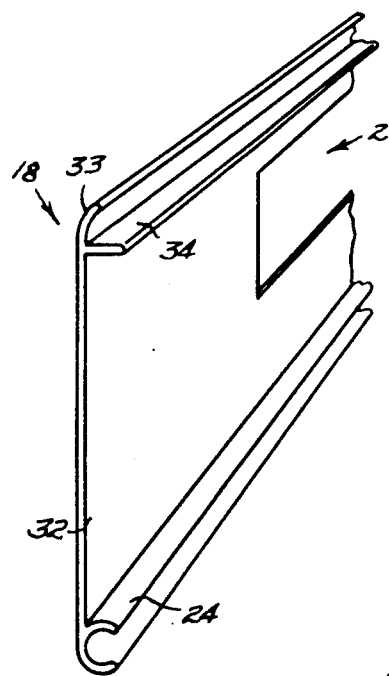

FIG. 6 is a perspective view of one of the extruded elongate side plate elements in a somewhat fragmented form and indicating the receiving notch for location of a receptacle at an access opening.

Figure 7:
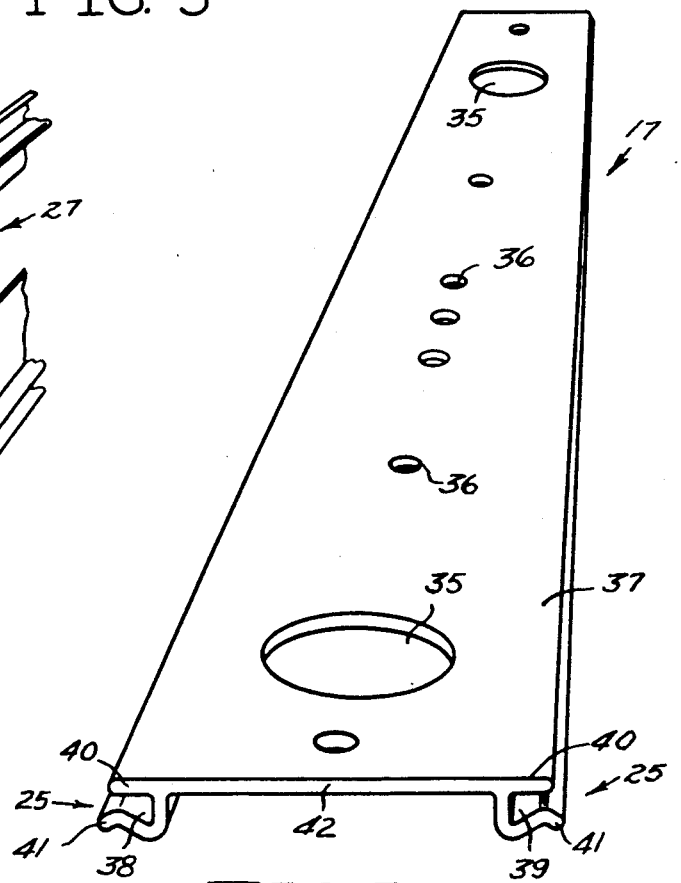

FIG. 7 is a perspective view of an elongate top plate extrusion which attaches to the bottom of a wall panel and includes specially shaped oppositely facing end clip flange sockets which receive the upper connecting projections of the side plates in the interlock extruded structures.

FIG. 8 is a perspective view of an elongate extruded bottom plate which is provided with a pair of sockets symmetrically positioned on either edge of the plate and the sockets facing outward to connect and interlock with the lower interlock extensions on the side plates.

FIG. 9 is a perspective view of a short, straight connector spring clip useable primarily as a joint cover element between two sections of raceway.

FIG. 10 is a perspective view of a straight passthrough and 3 way outside clip and both the clip of FIG. 9 and the clip of FIG. 10 having the same cross section through the length thereof.

FIG. 11 is a perspective view of an inside corner connection which, with spring and snap, closes the clip against the side plates by the interlock positioning as seen in FIG. 5.

FIG. 12 is a perspective of an outside transitional or curved cover clip functioning in cooperation with bottom edge connection to the side plates as otherwise shown.

SPECIFIC DESCRIPTION

Referring to the Drawings and with first particularity to the FIG. 1 thereof the raceway 11 of the present invention is seen in relation to a pair of sections 12 at the transitional inside corner section 13. These sections 12 and 13 of the raceway 11 are attached to and depend from the panels 14 and are partially supported, as will be seen, by the extendable legs of the feet 15. Intermediate the sections 12, the transitional corner 13 is trimmed, as will be seen, against and overlaps, the adjacent planar configuration of the adjacent sections 12 and against the columnar corner 16. Each section 12 comprises interlocking extrusions, the top plate 17, the pair of facing side plates 18 and the bottom plate 19. These plates 17, 18 and 19 are extruded from material providing good rigid wall surface in such materials as metals like aluminum, brass and bronze and alloys thereof or such plastic or resin materials as polyvinyl chloride (PVC), polyethylene or the like having rigid durable pigment carrying integrity and amenable to precision extrusion with the capability of being buffed or polished and decoratively presented. The extrusions are selectively elongate to suit particular length and styles of wall panels 14. The corner section 13, as will be seen, interlocks with the socketing provisions which will be appreciated as located adjacent the bottom elongate edges of the bottom plates, as will be seen, and extend to the overlap by the tangential transitional covering of the edges of section 12.

The raceway 11 thus provides a channel like receptacle through which selected power lines or communication lines can be extended and concealed for usage in the resulting assemblages of panels 12 served by the raceway 11. As will also be seen the sectionalization of the modules of the present invention, at assembly permits the inclusion of a selection of a variety of convenient receptacles and connectors allowing the continuity of power flow and communications flow from panel to panel and proximate to work surfaces bounded by the panels or extending from the panels 14 without exposure of a spider web of electrical inclusions.

In the FIG. 2 the elevation aspects of the FIG. 1 are better presented and the legs 20 are seen passing through the raceway 11 and in support of the panel 14. The feet 15 provide, with the leveling adjustment, the principal support for the panels 14 and the adjustment is via the threaded sleeve elements 21 in the panels 14 and the legs 20 extending through the raceway 11 as indicated. The overlap of the transitional cover or transitional plate 13 is also visible.

In the FIG. 3 the external corner transition element 22 is shown overlapping the columnar element 16 and overlapping the side plates 18 and the bottom plate elements 19 which are supported by the panels 14 as previously related and as seen in FIG. 2. The location of one of the feet 15 is indicated in hidden edge line.

At this juncture it is important to note that panels 14 may be placed in end to end abuting relation and in such instances plural sections of the raceway 11 are extended beneath the panel 14 and are fastened thereto by the feet 15 and by auxiliary fasteners such as screws, bolts, and the like. In right angle abutments the panels 14 do not require the transition curves noted in FIGS. 1 and 3 unless such an option is desired.

FIG. 4 assists in visualizing the simplicity of field assembly of the raceway 11. The top plate 17 is attached to the bottom of the panel 14 as shown. The bottom plate 19 with its open C shaped protuberant edges 23 is mated by rolling interlock with socketlike lower curled edges 24 of the side plates 18 and which are tiltably assembled to roll on the edges 23 and snap into detenting engagement in the grooved elongate edges 25 of the top plate 17. As shown in FIG. 4 a receptacle or connector 26 is shown supported in the raceway 11 and the side walls formed by plates 18 are provided with opening 27 for flush presentation therethrough of the extensions 28 on either or both sides of the raceway. The cover plate 29 closes nestably over the roll socket elements 24 along the lower edges of the side plates 18 where they are accessibly sprung on the roll socket elements at the curled edges 24 of plates 18 to snap-bias the nesting of the cover plate 29 against the surface of side plate 18. The springing is achieved by insertion of the S-shaped spring end of the cover plate 29 in the open portion of the sockets 24 of the side plates 18 at the overlap of cover plate 29 and side plates 18. Energy conductors 51 are indicated as within the raceway 11.

By reference to the FIG. 5 the snap bias nesting connection of the cover plate 29 to the lower open-C curled edge 24 of the side plate 18 is better understood. Access to the curled lower edge of side plate 18 by the S-shaped lower edge 30 of cover 29 occurs since no bottom plate 19 is located at the zone of connection or the bottom plate 19 may be notched to permit the illustrated access by cover plate 29. In phase A of FIG. 5 the contact has been made along the bottom edge. In Phase B of FIG. 5 the rolling or tilting engagement of the end 30 of the cover plate 29 has proceeded as shown. In Phase C of FIG. 5 the rolling, upon continuance, provides a spring retained and nesting relationship between the lower extremity 31 of the plate 29 and this springs the cover plate 29 into cover nesting relation to the side plate 18 as indicated and in register with the extension 28 of the receptacle 26 as shown. The opening 32 in the cover plate 29 may be eliminated where an access opening may, for example, be covered.

The FIGS. 6–12 inclusive exemplify the major extrusions and profiles of the interlocking elements comprising the raceway 11 as thus far described.

FIG. 6 shows the elongate side plate 18 and indicates a typical receptacle access opening 27 as selectively cut in the web portion of the side plate 18. The cross section through the extrusion forming the elongate side plates 18 is readily visible and including the lower edge open C roll socket element 24. A matching exterior curvature is provided on the uppermost edge 33 against which the cover plate 29 was seen to nest in the FIG. 5. A shallow flange or rib 34 extends longitudinally inwardly of the side plate 18 adjacent the top edge 33. The rib or flange 34 inserts into a groove as will be seen, in the top plates 17 where the rib 34 is in a detent-compression relationship upon insertion at assembly. In FIG. 7 the extruded top plate 17 is best appreciated and with openings 35 and 36 cut through the web portion 37. In general the top plate is planar through the web portion and the longitudinal edges 25 are symmetric on either side of the web 37 in forming edge continuous grooves 38 and 39 between the integral receiving lips 40 and 41. The lowermost of the lips 41 (indicated downturned) are somewhat ramped to guide the flanges 34 of the side plates into interlocked or detenting compression relation. As shown the openings 35 receive the receptacles or connectors 26 through which the legs 20 for leveling and connection to the panels 14 are achieved. The openings 36 are supplemental fastener openings for assisting in the connection of the bottom plate 19 to the lowermost longitudinal edge of panels 14. They are sized and located as required to particular panels 14. The cross section configuration of the extruded top plate 17 is appreciated at its end 42.

FIG. 8 shows the extruded bottom plate 19 penetrated along its web 43 by access openings 44 for the passage of the levelling legs 20 as previously indicated (FIG. 4). Stiffening ribs 45 run longitudinally on each side of the bottom plate 19 and in symmetric relation for the length of the bottom plate 19 adjacent the outermost edges of the bottom plate 19.

The longitudinal edges 23 of the bottom plate 19 are cylindrical generally with elongate openings giving them an open C shaped configuration as represented. By reference to FIG. 4 this configuration provides the limited rolling fit for the lower edges 24 of the side plates 18 and which allows assembly and nesting interlock between the side plates 18 and the bottom plate 19. When closed against the top plate 17 the flange 34 latches into the grooves 25 in a neat and trim appearance.

FIGS. 9, 10, 11 and 12 are illustrative of variants in cover plates 29 which trim to the nesting relationship shown in the FIG. 4. In the FIG. 4 the cover plate 29 included the openings in accommodation of the extension 28 of receptacle 26 for example. In the FIGS. 9, 10, 11 and 12 the cover plates 29A, 29B, 29C and 29D function similarly but are used in various gap closure and trim relations. Each includes the roll-spring lower edge which grips the open C portion 23 of the bottom plate 19 by means of the S configuration 30 and upon closure snaps into the nesting contact against the regular side plates 18 and secure against the curl at 31 around the accessible side plate edges 24. FIG. 10 is a cover plate 29B which, for example, closes a wide access opening provided between sections 12 or in a particular section 12. FIG. 11 is an inside transitional cover plate 29C useful in closing a corner and utilizing the roll snap fastening. The FIG. 12 is exemplary of a cover plate 29D for a transitional external corner.

The preferred material for fabrication of the extrusions is a relatively rigid polyvinyl chloride (PVC) but other resin or plastic materials are acceptable subject to cost, strength and performance. In addition metal extrusions have been successfully used. In great measure styling and decoration may dictate a particular choice of material.

Since the power lines carried are primarily electrical the practical material is in the resins having good insulating qualities and that will stand up well under climatic variations and thermal variances. The material should be tough, scuff resistant and should not fade in light exposure.

In practicing the invention the extrusions may be cut to length accurately and to suit the requirements of any particular panels. Some panels 14 are sandwich panels on a core of walled voids covered by fabric webbing, or decorative room divider textures, materials and trim. Usually the panels are framed. The present invention adapts to a wide spectrum of such structures while providing power distribution in convenient locations.

While the energy distribution structure of the present invention is intended for retrofit to existing panels it is also useful in the fabrication of new panels and in situations where extreme flexibility of location and knock down simplicity for transport is desired.

Having thus described my invention and the preferred embodiment thereof, others will appreciate improvements, changes and modifications within the skill of the art. Such improvements changes and modifications are intended to be included hereunder limited only by the scope of my herewith appended claims.

I claim:

1. An improved panel and raceway system of the knock-down extrusion type for energy distribution for routing communication lines and electrical lines through interconnected panels to terminals and receptacles for flexibility and convenience in locating comprising:

plural, adjacent, abutting wall panels;
   extruded elongate top plates of sufficient length to each receive one of said wall panels;
   extruded elongate bottom plates each connected to the bottom edges of side plate pairs and interlocking therewith in roll socket engagement to form a channel closeable at interlock of said side plates with said top plates to define generally enclosed rectangular raceway sections, said raceway sections each beneath one of said wall panels;
   means having levelling feet through said top and bottom plates attaching each of said raceway sections to said wall panels; and extruded cover plates selectively located and interlocked with said side plates and closing against said side plates.

2. The combination of claim 1 wherein said cover plates are selectively sized by length to trim cover gaps between and at the ends of each of said sections.

3. The combination of claim 1 wherein said cover plates are curvilinear transitions at corners between adjacent 4. The combination of claim 1 wherein connector receptacles are located in said raceway sections and attached to selected of said side plates and said side plates define transverse openings therethrough in registry with said receptacles.

5. The combination of claim 4 including service lines in each said raceway section and said service lines selectively connected to said receptacle.

6. A power distribution raceway combination for attachment to a wall panel and including;
an extruded, relatively rigid resin top plate extending substantially the length of said wall panel and including elongate latch-like receiving sockets along the outer longitudinal edges thereof and said top plate having transverse openings therethrough at selected intervals;
an extruded resin bottom plate in spaced apart registry with said top plate, the longitudinal edges of said bottom plate having roll-sockets which are symmetrically positioned on both sides of a longitudinal center line of said bottom plate and extending the entire length thereof;
a pair of elongate extruded side plates of a relatively rigid resin material tiltably engaged with said roll sockets of said bottom plate and detentably closing on said top plates in said latch-like socket edges thereof and defining with said bottom plate a channel-like raceway along the length thereof, said side plates defining selected openings therethrough sized to provide access to said raceway;
power line connectors and receptacles in said raceway; said connectors and receptacles located in registry with said openings in said side plates; and
extruded cover plates tiltably and releasably engaged with said longitudinal roll sockets of said bottom plates and said side plates and biased nestably against said side plates and covering said openings in said side plates and for providing coverings extending beyond each of said raceway sections.

7. The combination of claim 6 including adjustable height feet at selected intervals.

* * * * *

UNITED STATES PATENT AND TRADEMARK OFFICE
CERTIFICATE OF CORRECTION

PATENT NO. : 5,091,607
DATED      : February 25, 1992
INVENTOR(S) : Henry Richard Stob It is certified that error appears in the above—identified patent and that said Letters Patent is hereby corrected as shown below:

Col 7, line 9 after "adjacent" there should appear the words --- of said panels. ---

Signed and Sealed this

Sixth Day of April, 1993

*Attest:*

STEPHEN G. KUNIN

*Attesting Officer*      Acting Commissioner of Patents and Trademarks